(12) United States Patent
Schlegel

(10) Patent No.: US 12,140,051 B2
(45) Date of Patent: Nov. 12, 2024

(54) METHOD FOR INCREASING AN ENTROPY FLOW IN A TURBOMACHINE

(71) Applicant: Peer Schlegel, Chemnitz (DE)

(72) Inventor: Peer Schlegel, Chemnitz (DE)

( * ) Notice: Subject to any disclaimer, the term of this patent is extended or adjusted under 35 U.S.C. 154(b) by 102 days.

(21) Appl. No.: 17/906,093

(22) PCT Filed: Mar. 11, 2021

(86) PCT No.: PCT/DE2021/000053
§ 371 (c)(1),
(2) Date: Sep. 12, 2022

(87) PCT Pub. No.: WO2021/180261
PCT Pub. Date: Sep. 16, 2021

(65) Prior Publication Data
US 2023/0175417 A1 Jun. 8, 2023

(30) Foreign Application Priority Data
Mar. 13, 2020 (DE) .......................... 102020001778.9

(51) Int. Cl.
*F01K 25/00* (2006.01)
*F01K 13/02* (2006.01)
(Continued)

(52) U.S. Cl.
CPC ............ *F01K 25/065* (2013.01); *F01K 13/02* (2013.01); *F01K 25/04* (2013.01); *F02C 1/10* (2013.01)

(58) Field of Classification Search
CPC ........ F01K 25/065; F01K 13/02; F01K 25/04; F01K 25/06; F02C 1/10
See application file for complete search history.

(56) References Cited

U.S. PATENT DOCUMENTS

| | | | | |
|---|---|---|---|---|
| 2,151,949 A | * | 3/1939 | Turner | ..................... F01K 25/04 55/400 |
| 3,972,195 A | * | 8/1976 | Hays | ....................... F01K 25/04 60/671 |

(Continued)

FOREIGN PATENT DOCUMENTS

| | | |
|---|---|---|
| AT | 506353 A1 | 8/2009 |
| DE | 2654097 A1 | 6/1978 |

(Continued)

OTHER PUBLICATIONS

International Search Report issued in PCT/DE2021/000053 Jan. 14, 2022.

*Primary Examiner* — Matthew T Largi
(74) *Attorney, Agent, or Firm* — Blank Rome LLP

(57) ABSTRACT

The invention relates to a method for increasing the efficiency of a turbomachine, wherein a fluid guided through the turbomachine transfers kinetic energy to the turbomachine. The object of the invention is to increase the efficiency of a turbomachine. This object is achieved in that the fluid or at least one fluid component of the fluid is compressible, and that the flow velocity of the fluid reduced in the turbomachine (1) during the transfer of kinetic energy is increased directly downstream of the turbomachine (1) by a force $F_B$ generated by means of a force field and acting in the direction of flow, by converting potential energy of the fluid into kinetic energy of the fluid to such an extent that the pressure of the fluid, which is reduced in the turbomachine (1), is thereby increased again to at least 0.1 times the pressure of the fluid upstream of the turbomachine (1).

8 Claims, 9 Drawing Sheets

Figure 1:
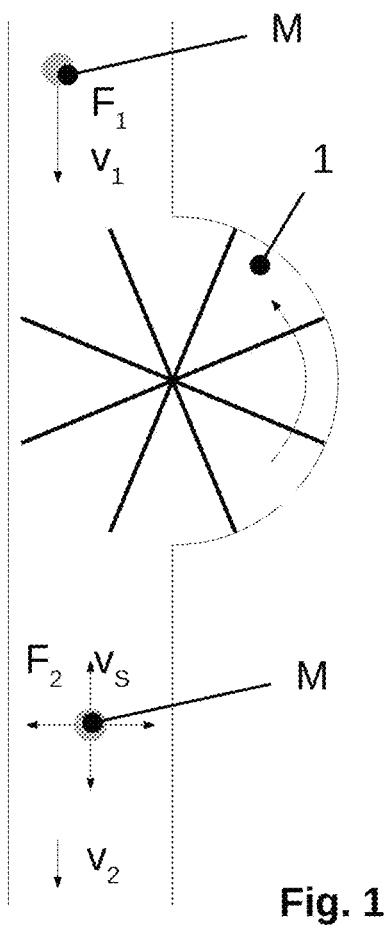

(51) Int. Cl.
    *F01K 25/04*     (2006.01)
    *F01K 25/06*     (2006.01)
    *F02C 1/10*     (2006.01)

(56)           References Cited

U.S. PATENT DOCUMENTS

| | | | |
|---|---|---|---|
| 4,008,573 | A | 2/1977 | Petrillo |
| 4,106,294 | A * | 8/1978 | Czaja .................. F01K 21/04 |
| | | | 60/649 |
| 4,485,629 | A | 12/1984 | Le |
| 7,401,475 | B2 * | 7/2008 | Hugenroth ............ F01C 11/004 |
| | | | 62/335 |
| 2012/0006022 | A1 | 1/2012 | Woodland et al. |
| 2013/0241204 | A1 * | 9/2013 | Brookman .............. F01K 25/00 |
| | | | 60/659 |
| 2015/0030438 | A1 | 1/2015 | Takahashi et al. |
| 2019/0017411 | A1 | 1/2019 | Hülsemann et al. |
| 2019/0128148 | A1 | 5/2019 | Lindner |

FOREIGN PATENT DOCUMENTS

| | | | |
|---|---|---|---|
| DE | 19533249 C1 * | 2/1997 | ............ F01K 25/08 |
| DE | 102006055804 A1 | 5/2008 | |
| DE | 102012108222 A1 | 10/2013 | |
| DE | 102014004237 A1 | 7/2015 | |
| DE | 102017127716 A1 | 5/2019 | |
| GB | 2528522 A | 1/2016 | |
| WO | 2017096280 A2 | 6/2017 | |

* cited by examiner

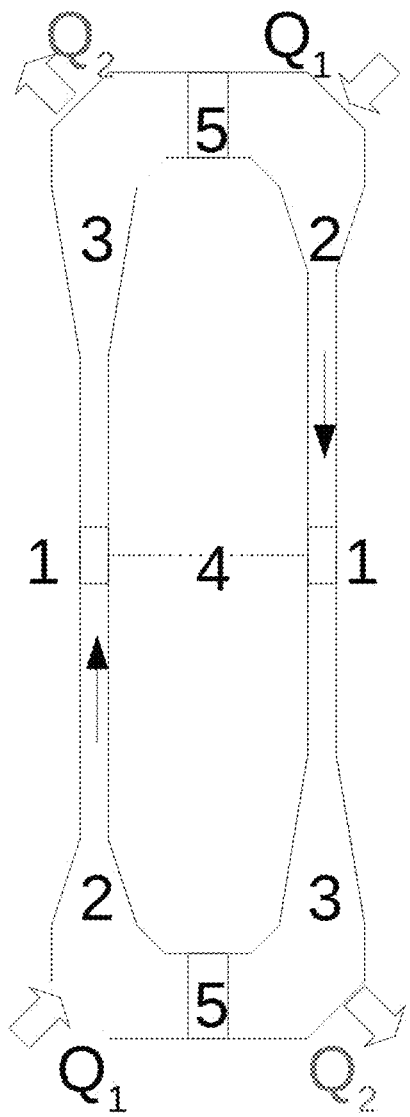
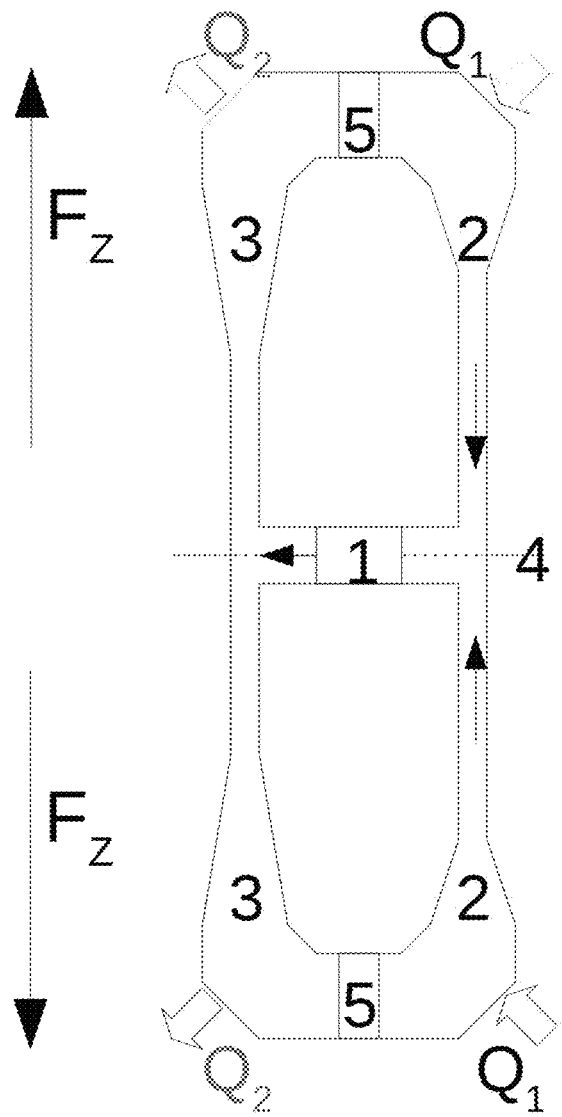
Fig. 4 a)  Fig. 4 b)

METHOD FOR INCREASING AN ENTROPY FLOW IN A TURBOMACHINE

This application is a national stage of International Application No. PCT/DE2021/000053 filed Mar. 11, 2021, which claims the benefit of German Application No. 10 2020 001 778.9 filed Mar. 13, 2020.

The invention relates to a method for increasing the efficiency of a turbomachine, wherein a fluid guided through the turbomachine transfers kinetic energy to the turbomachine.

Thermodynamic cycles are used in many different ways to convert energy in technology. In the most important processes for public energy supply, most of the energy used is still supplied by fossil fuels that accumulated on Earth over millions of years through photosynthesis. This is increasingly becoming a problem as humanity's energy needs rise, since these energy resources cannot be replaced in the same quantity. Furthermore, the use of these forms of energy causes a high environmental burden. Therefore, these forms of energy must increasingly be replaced by regenerative forms of energy. However, this is associated with a number of problems.

The two primary quasi-unlimited energy sources are nuclear fusion in the Sun and nuclear fission inside Earth (geothermal energy). They drive all the energy cycles on Earth. This energy can then also be used secondarily, e.g., as wind power, hydropower or geothermal energy. The amounts of primary energy released annually are more than sufficient to meet people's energy needs. However, they are not available in every location and at every time. Furthermore, the development of renewable energy sources often involves high costs. The long energy-payback time and low yield factor are among the reasons for the continued large-scale use of fossil fuels.

Processes for energy conversion and storage and their efficiencies therefore play a decisive role. Up to now, only chemical energy (in methane or hydrogen, for example) has been suitable for storing large amounts of energy over longer periods of time (>6 months). Although battery storage systems have good efficiencies, they are only an alternative for mobile devices or daily storage because of the high costs and rare materials required. Pumped-storage power plants can only be used in areas with large differences in altitude. Thermal energy storage, although theoretically offering a high energy-storage capacity per unit volume, requires large temperature differences to convert this energy into other forms of energy. This also increases thermal losses, however. Thermal storage units are therefore suitable for balancing daily fluctuations in heat supply. They are of little significance for conversion into other forms of energy, as the efficiency of energy conversion is low.

Industrial energy supplies mainly use thermodynamic processes, where the optimisation potential of gas or steam power plants is limited. The maximum efficiency is limited by the maximum temperature achievable with the material and the ambient temperature. The problems associated with energy conversion using thermodynamic processes are particularly evident in the case of the compressed-air-storage power plant, which has not yet achieved any commercial significance. When the air is compressed, the thermal energy is increased.

Since the underground storage tanks used cannot be thermally insulated, some heat energy is lost to the environment. When energy is released, the compressed air expands again, causing severe cooling and icing. Here, the energy lost during compression has to be replaced by burning natural gas, for example. Since expansion is always required for the delivery of pressure-volume work, a large temperature difference is aimed for in all thermodynamic processes.

In thermodynamic processes, a distinction is made between right-hand (delivery of pressure-volume work, heat engines) or left-hand (refrigerating machines, heat pumps) processes.

In essence, thermal energy is the sum of the effects of various forms of kinetic energy. The (internal) energy of a thermodynamic microstate consists of three essential components: translational energy $E_{trans}$, vibrational energy $E_{vib}$ and rotational energy $E_{rot}$. Thus, each form of energy can also be assigned a corresponding share of the total entropy ($S_{ges}=S_{vib}+S_{rot}+S_{trans}$).

$E_{vib}$ is relatively low for gases and can usually be neglected. For monatomic gases, $E_{trans}$ dominates. In the liquid state, $E_{trans}=0$ and $E_{rot}$ becomes dominant. In the solid state, molecular rotation is also not possible and the total energy is determined by $E_{vib}$. In polyatomic gases and at interfaces between gases, liquids and solids, these different forms of kinetic energy interact. This establishes a dynamic equilibrium between kinetic forms of energy.

Only the translational part ($E_{trans}$) of the internal energy can be used directly to perform pressure-volume work. However, if the translational momentum ($p_{trans}$) decreases, the vibrational and rotational energy and entropy are transferred to the translational movement. The translational energy and entropy increase again and the vibrational and rotational components decrease. The momentum determines the direction of the thermal energy flow and correlates with temperature. In right-hand thermodynamic processes, thermal energy is supplied and mechanical energy is released when the translational momentum of the molecules is high (high temperature). At low momentum (low temperature), thermal energy is dissipated and mechanical energy is supplied. Because of the energy-momentum relationship, more mechanical energy is released than supplied. With a heat pump (left-hand system), the process is inverted. This means that mechanical work must be added to the overall process. The ratio of the momentum intensity thus also determines the efficiency.

The conversion of thermal energy into directed mechanical energy can take place with an isentropic change of state. However, the operating principles of a piston machine and a turbomachine are different. The force acting on a piston results from the mean momentum of the molecules and the frequency of impacts (pressure). The molecules hit the piston with a mean velocity approximately equal to the speed of sound. The mean momentum is thus calculated from the molecular mass and the speed of sound ($\bar{p}=m^*v_s$). If the piston moves during an expansion, the relative speed drops below the speed of sound. This means that the mean effective momentum is always slightly below the momentum at the speed of sound. With compression, on the other hand, it is slightly higher than the momentum at the speed of sound, since the piston is moving in the opposite direction.

Turbomachines are known from the prior art. In these, a compressible working medium is first accelerated by a convergent nozzle. Unlike many other forms of energy, thermal energy has no effective direction vector in space. It acts in all spatial directions simultaneously. The convergent nozzle converts this undirected translational energy into directed lateral energy of the flow. However, this means that the flow can only be accelerated up to the speed of sound, since above this speed there is no translational energy available for the conversion. A de Laval nozzle offers a solution for acceleration beyond the speed of sound. With this, after reaching the speed of sound, the flow cross section is enlarged again. The pressure-volume work so released permits further lateral acceleration. One disadvantage is the reduction in entropy due to the increase in cross section of the de Laval nozzle. One alternative is described in DE 10 2014 004 237 A1. Here, a mixture of gas and a liquid is mixed and accelerated. By adding rotational and vibrational energy from the fluid, the multiphase flow can be accelerated beyond its speed of sound without increasing the cross section. According to the energy equation $E=m/2*v^2$, the higher speed enables a higher amount of energy to be delivered and thus provides a higher efficiency compared to a piston machine. A similar process is described in DE 10 2012 108 222 A1. Here, too, a multiphase flow (air/water) is accelerated to a supersonic speed. The water component here increases the mass of the flow and compensates for the reduction in translational energy by supplying the rotational and vibrational energy of the water molecules.

A little-considered problem with turbomachinery is the acceleration of the molecules downstream of the turbomachinery. Please refer to FIG. 1. The molecules move with velocity $v_1$ in the flow channel (see FIG. 1). On hitting the turbomachine (4), they deliver a large part of their lateral kinetic energy to the turbomachine and move on with velocity $v_2$. Since velocity $v_2$ is very low due to the energy dissipated, the speed of sound ($v_s$) dominates in the molecular movement. Thus, a force $F_2$ also acts against the direction of flow. This force is influenced by the intensity and frequency of molecular impacts against the direction of flow and limits the efficiency of the turbomachine.

In order to reduce the force and increase the efficiency, thermal energy is dissipated to an external reservoir in the technique. This lowers the temperature and thus the intensity of the molecular impulses. However, in order to significantly reduce the intensity, a great deal of thermal energy and entropy must be dissipated. In the (Clausius-)Rankine and organic Rankine cycles, the translational velocity is reduced to zero by condensation. However, the entire translational energy must be dissipated, as must part of the vibrational and rotational energy in the case of polyatomic molecules.

DE 26 54 097 A1 describes the operation of a right-hand cycle below ambient temperature. This has the problem of dissipating the thermal energy into the environment, however. The author proposes a heat pump as a solution, but does not explain why this heat pump should require less drive energy than is additionally released by the greater temperature difference in the right-hand process. Thermal and frictional losses at the heat pump mean additional thermal energy must be dissipated, which, according to the law of conservation of energy, reduces the useful energy of the overall system.

DE 10 2017 127 716 A1 describes a method for cooling by isothermal compression. The method uses the force of gravity for isothermal compression. The turbomachine is not located in the flow channel of the multiphase flow, however, and the aim of the method is compression upstream of the turbomachine. Because of the low entropy flow in the turbomachine in relation to the multiphase flow, the process is not intended for the generation of mechanical energy, but for cooling.

The object of the invention is to increase the efficiency of a turbomachine.

In the method according to the invention, a flow of a compressible fluid is fed to a turbomachine. In the turbomachine, kinetic energy is transferred from the fluid to the turbomachine. After a polytropic expansion in the turbomachine, the flow velocity of the fluid downstream of the turbomachine, which is reduced in the turbomachine during the transfer of kinetic energy, is increased by a force $F_B$, generated by a force field and acting in the direction of flow, by converting potential energy of the fluid into kinetic energy of the fluid to such an extent that the pressure of the fluid, which is reduced in the turbomachine, is thereby increased again to at least 0.1 times the pressure of the fluid upstream of the turbomachine. Technically, of course, the increase in pressure of the fluid downstream of the turbomachine is limited to the pressure of the fluid upstream of the turbomachine. The force $F_B$ in the direction of flow is generated by a force field, such as a gravitational field, a centrifugal field, a magnetic field or an electric field. The dislocation of the molecules in the direction of flow causes potential energy due to the field to be converted into kinetic energy.

In the method according to Claim 1, the force $F_B$ acting in the direction of flow partially or completely compensates for a thermodynamic force $F_2$ acting against the direction of flow. The increase in the flow velocity of the fluid downstream of the turbomachine due to the force $F_B$ causes an increase in the pressure of the fluid in the further course of the flow downstream of the turbomachine. The resulting reduction in the pressure of the fluid directly downstream of the turbomachine increases the efficiency of the polytropic expansion in the turbomachine. The molecules of the fluid are accelerated to a velocity $v_2$ by the force $F_B$. If the fluid is a gas, for example, the velocity $v_2$ should be at least 0.3 times the speed of sound in the fluid. $F_B$ is thus of the same order of magnitude as $F_2$. For a mixture of two gases, the velocity $v_2$ should be at least 0.3 times the weighted average of the speeds of sound in the two gases. The acceleration of the molecules of the fluid downstream of the turbomachine has a great influence on its efficiency. The aim of the acceleration is to reduce the pressure and thus the force against the direction of flow directly downstream of the turbomachine. The greater the acceleration downstream of the turbomachine, the greater the influence of the method according to the invention on the efficiency of the turbomachine, although the increase in the flow velocity downstream of the turbomachine is of course limited to the flow velocity upstream of the turbomachine. Compared to a flow velocity of 0.3 times the speed of sound in the fluid, higher efficiencies are achieved for the efficiency of the turbomachine if the flow velocity downstream of the turbomachine is accelerated, for example, to 0.5 times or 0.6 times or 0.8 times the speed of sound in the fluid, or to the speed of sound in the fluid, whereby the flow velocity upstream of the turbomachine is then at least about 0.51 times or 0.61 times or 0.81 times or 1.01 times the speed of sound in the fluid.

If, on the other hand, the fluid consists of a gas and a liquid, the velocity $v_2$ should be so high that the translational velocity of the molecules of the gas (the compressible fluid component) is at least 0.3 times the speed of sound in the gas.

In methods according to the prior art, acceleration of the flow is achieved by dissipating thermal energy and entropy to the environment. In the method according to the invention, the dissipation of thermal energy necessary for acceleration is eliminated or at least significantly reduced by generating the acceleration of the molecules of the fluid with the force $F_B$ acting through a force field in the direction of flow. The force $F_B$ is independent of the molecule's state of motion and can thus accelerate even molecules with high kinetic energy. A higher kinetic energy and the associated higher kinetic momentum of the molecules makes it possible to dissipate thermal energy to an external reservoir (energy sink) with greater intensity (temperature) after acceleration.

According to Claims 3 and 4, the compressible fluid is accelerated in the direction of flow upstream of the turbomachine with a convergent nozzle. A divergent nozzle and/or a compressor are located downstream of the turbomachine in the direction of flow.

The compressible fluid is thus first accelerated at the convergent nozzle, whereby translational kinetic energy of the molecules ($E_{trans}$) is converted into lateral kinetic energy ($E_{lat}$), the vibrational and rotational energies ($E_{vib}$, $E_{rot}$) of the molecules of the fluid are converted into translational energy ($E_{trans}$) and the fluid flow is accelerated to a velocity $v_1$. This also increases the translational entropy component ($S_{trans}$). Energy and momentum are released in the turbomachine so that the velocity of the fluid flow is significantly reduced again. The force $F_B$ in the flow channel then accelerates the molecules of the fluid downstream of the turbomachine to velocity $v_2$. In the divergent nozzle and/or compressor, the energy and entropy components at constant pressure ($E_{trans}$, $S_{trans}$) then decrease through conversion into vibrational and rotational energy. These components do not have to be dissipated externally. A complete compensation of $F_2$ would require the acceleration of the molecules to the speed of sound. A significant increase in the efficiency of the turbomachine is achieved for a velocity $v_2$ with 0.3 or more times the speed of sound in the fluid. When accelerated to the speed of sound itself, a vacuum is created directly downstream of the turbomachine. In the divergent nozzle, part of the lateral kinetic energy is converted back into undirected thermodynamic motion, whereupon the temperature and pressure increase. This means that less or no thermal energy has to be dissipated into the environment, which reduces global warming due to thermodynamic processes. The flow then moves on with a low lateral velocity ($v_3$).

The lateral velocity ($v_1$) of the molecules upstream of the turbomachine should be greater than the speed of sound. At a higher speed, according to $E=m/2*v^2$, more energy is released than is needed to accelerate the molecules to the speed of sound with $F_B$. Fundamentally, acceleration above the speed of sound is based on the principle of relativity. In the convergent nozzle, the translational movement of the molecules is converted into a lateral movement in the direction of flow. However, the mean velocity relative to an observer outside the flow remains constant. This means that no additional energy can be supplied from outside despite the lower temperature. However, with respect to the vibrational and rotational energy carried in the flow, the intensity of the translational motion of the molecules decreases. This results in a conversion of vibrational and rotational energy into translational energy, which can thus be used in addition to the lateral acceleration. The lateral velocity can thus be higher than the mean translational velocity (speed of sound) at the entrance of the convergent nozzle. In this way, energy with lower intensity (momentum, temperature) can be supplied. This increases the energy conversion and energy efficiency of the process.

With negative acceleration in the divergent nozzle, the energy flow acts in the opposite direction. The lateral kinetic energy is converted into a disordered translational movement of the molecules and increases its intensity. This means that part of the translational energy can be converted into vibrational and rotational energy. If thermal energy is dissipated to the environment, the vibrational and rotational energy must also be dissipated. However, if the flow is additionally accelerated beforehand by the external force $F_B$, the proportion of volume-independent vibrational and rotational energy increases. More energy can therefore be stored in the flow and released again during a renewed acceleration.

The ratio of vibrational and rotational energy to translational energy is described by the isentropic coefficient. Therefore, the fluid in the working temperature range should have at least one fluid component with an isentropic coefficient of less than or equal to 1.4. A higher efficiency is achieved with a fluid where at least one fluid component has an isentropic coefficient less than or equal to 1.2. The efficiency is even higher with an isentropic coefficient less than or equal to 1.1.

The fluid can be a gas or a multiphase flow, whereby, for the purposes of the application, "multiphase flow" is understood to mean both gaseous mixtures and mixtures of gases and liquids. In a multiphase flow, substances with high isentropic coefficients ($c_p/c_V$), such as helium, should be mixed with substances with low isentropic coefficients, such as n-butane. The non-volume-dependent component of thermal energy (vibrational and rotational energy) should have a high heat capacity in relation to the translational energy. In principle, it is also possible to calculate an isentropic coefficient ($c_p/c_V$) for fluids. This has a value around 1. The advantage of gas mixtures is the better energy exchange due to the larger effective area of the individual molecules. In pure substances (fluids consisting of one gas), the proportion of vibrational and rotational energy is determined by the molecular structure. Gases with a very low isentropic coefficient and high molecular mass should therefore be used. A multiphase flow consisting of a gaseous and a liquid fluid component can also be used, whereby, in order to generate the pressure reduction downstream of the turbomachine, the velocity $v_2$ should be so high that the translational velocity of the molecules of the gas (compressible fluid component) is at least 0.3 times the speed of sound in the gas.

In the further development of the method according to Claim 6, a fluid mixture is used as the working medium. This combines a fluid with high vapour pressure and a fluid with low vapour pressure. The pressure at the inlet of the convergent nozzle is selected such that both fluids are liquid (vibrational and rotational energy). If the pressure drops during acceleration in the convergent nozzle, the fluid with the higher vapour pressure reaches its boiling point. By transferring vibrational and rotational energy from the fluid with the low vapour pressure, the fluid with the high vapour pressure is completely vaporised. The physical effect of evaporation described is also the basis of cavitation, which is usually to be avoided in turbomachinery. In the method according to the invention, however, this effect is deliberately intensified in order to achieve a high acceleration of the flow. The now compressible fluid (with translational energy) is strongly accelerated in the flow channel due to the increase in volume and gives off energy and momentum to the turbomachine. By increasing the pressure in the divergent nozzle and/or compressor, the condensation point is reached and the compressible component of the fluid gives up its translational energy to the incompressible fluid component (vibrational and rotational energy).

In an alternative further development according to Claim 7, a reversible chemical process can also be used. In this process, a gas dissolved in a liquid is fed to the convergent nozzle. If the pressure drops during acceleration in the convergent nozzle, the reaction equilibrium changes and gas escapes from the solution. This provides translational energy for high acceleration. The compressible fluid gives off energy and momentum to the turbomachine. By increasing the pressure in the divergent nozzle and/or compressor, the reaction equilibrium changes again and the gas dissolves in the liquid due to the chemical reaction. Translational energy is converted into vibrational and rotational energy.

The externally supplied energy for $F_B$ can be supplied by, for example, a gravitational force, a magnetic force, an electrical force or a centrifugal force. Likewise, a mechanical force can also be provided by a further turbomachine operated with energy supplied from outside, whereby this turbomachine is then arranged downstream of the divergent nozzle in the direction of flow.

Table 1 shows a comparison of the acceleration times and distances due to the gravitational force on Earth (~9.81 m/s$^2$) in free fall from zero to the speed of sound ($v_s$) for various substances at normal pressure and temperature (1 bar; 300K).

TABLE 1

| Substance | $v_s$ (m/s) | t (s) | s (m) |
|---|---|---|---|
| Helium | 1020 | 104 | 53028 |
| Nitrogen | 353 | 36 | 6351 |
| Carbon dioxide | 269 | 27 | 3688 |
| Xenon | 174 | 18 | 1543 |
| Water/air mixture | 10 | 1 | 10 |

The table shows that the gravitational force is particularly suitable for media with very heavy molecules and for multiphase flows. Since acceleration of the fluid to at least 0.3 times the speed of sound in the divergent nozzle increases the pressure and temperature, the process can also be operated below ambient temperature. Lower temperatures also make shorter acceleration distances and acceleration times possible due to the lower speed of sound. In a mixture of water and air with a high mass fraction of water, the water pressure increases from 0 bar to 1 bar over a fall of 10 m. This means that the air molecules are also compressed to this pressure and thus move at the speed of sound in air. The speed of sound in the overall flow, on the other hand, is much lower. A fall of just 10 m is thus sufficient for generating a vacuum downstream of the working machine. In a gravitational divergent nozzle, the speed of the molecules in or upstream of the divergent nozzle can therefore be increased. This reduces the lower pressure in the isentropic expansion and increases the efficiency of the thermodynamic process.

Greater forces than that of gravity can be generated with a centrifugal force. This shortens the acceleration distances and thus the dimensions of the thermodynamic machine. For this purpose, the thermodynamic machine is designed to be rotationally symmetrical and rotates about its rotational axis. The rotation creates an inhomogeneous phase space. The expected value (ensemble mean) increases with the distance from the rotational axis, as thus do the pressure, temperature and density. If the tangential velocity approaches the speed of sound, a near vacuum is formed at the rotational axis. The compressor serves to compensate for process losses (such as friction) and does not have to perform a great deal of pressure-volume work. It pushes the working medium into the convergent nozzle, where it is accelerated. An additional acceleration occurs due to the thermodynamic force with the centrifugal force $F_Z$ decreasing in the direction of flow. In the turbomachine, kinetic energy is extracted from the molecules at high speed. Afterwards, the molecules in the flow channel are accelerated in the direction of flow by $F_Z$. In the divergent nozzle, the pressure and the temperature increase. Upstream of the compressor, thermal energy ($Q_2$) can optionally be dissipated using a heat exchanger. Thermal energy ($Q_1$) is fed in downstream of the compressor. This reduces the pressure-volume work on the compressor. The transport of thermal energy via the wall of the flow channel is possible by thermal conduction but also by a fluid in a parallel flow channel.

A thermodynamic machine with a centrifugal convergent nozzle and a centrifugal divergent nozzle makes it possible to accelerate the molecules laterally beyond their speed of sound by changing the centrifugal force. Homogeneous substances and also multiphase flows can be used. When using multiphase flows with different isentropic coefficients, the temperature change is reduced and the tangential velocity and thus the radius can be reduced due to a greater incompressible component (rotational and vibrational energy). The translational component of the entropy flow increases during acceleration and thus also leads to a higher lateral velocity in the turbomachine.

Depending on the application, the turbomachine can be a turbine or an MHD generator.

In principle, however, the method according to the invention is suitable for increasing the efficiency of any polytropic expansion. For expansion in a piston machine, the energy is extracted at the speed of sound and the acceleration energy is supplied in the flow channel at relative speeds below the speed of sound. In the case of turbomachinery, however, a greater effect can be expected due to the higher achievable relative velocity during the delivery of mechanical energy. In piston machines, because of the discontinuous mode of operation, several pistons must also be operated in parallel and with offset phases so that a continuous flow is created in the flow channel.

Exemplary embodiments of the invention are described below with reference to the drawings.

THE DRAWINGS SHOW

FIG. 1 A flow of fluid with a turbomachine according to the prior art

Figure 2:
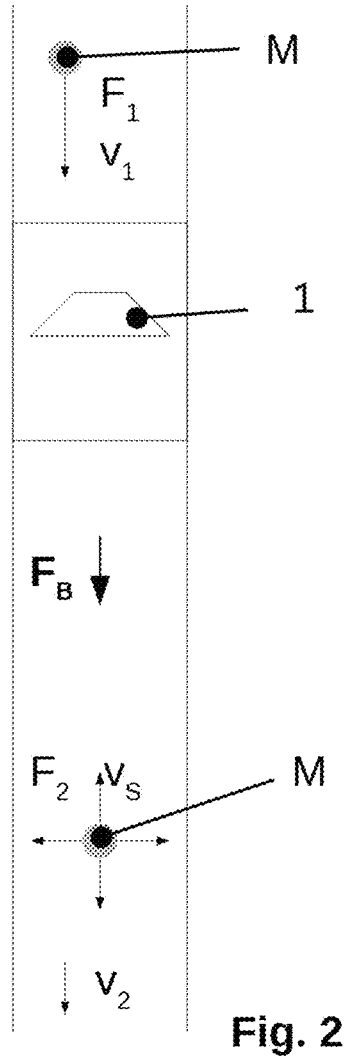

FIG. 2 An arrangement for using the method according to the invention

Figure 3:
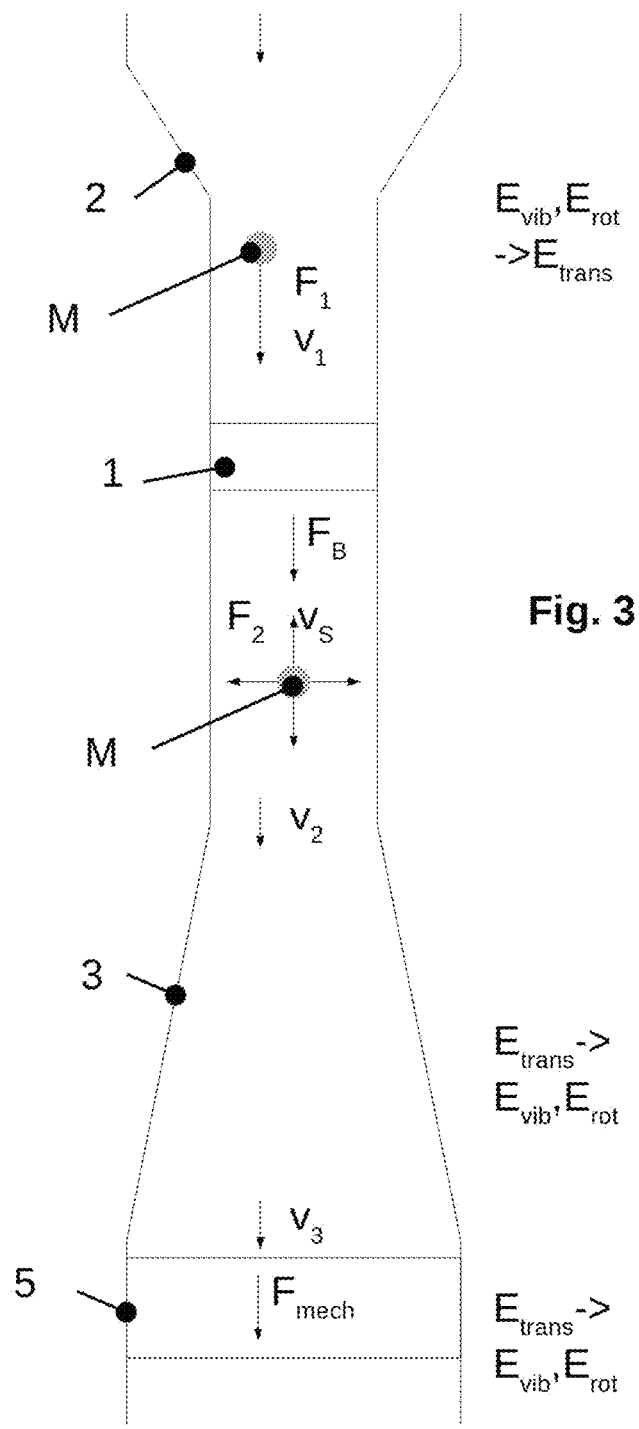
Figure 5:
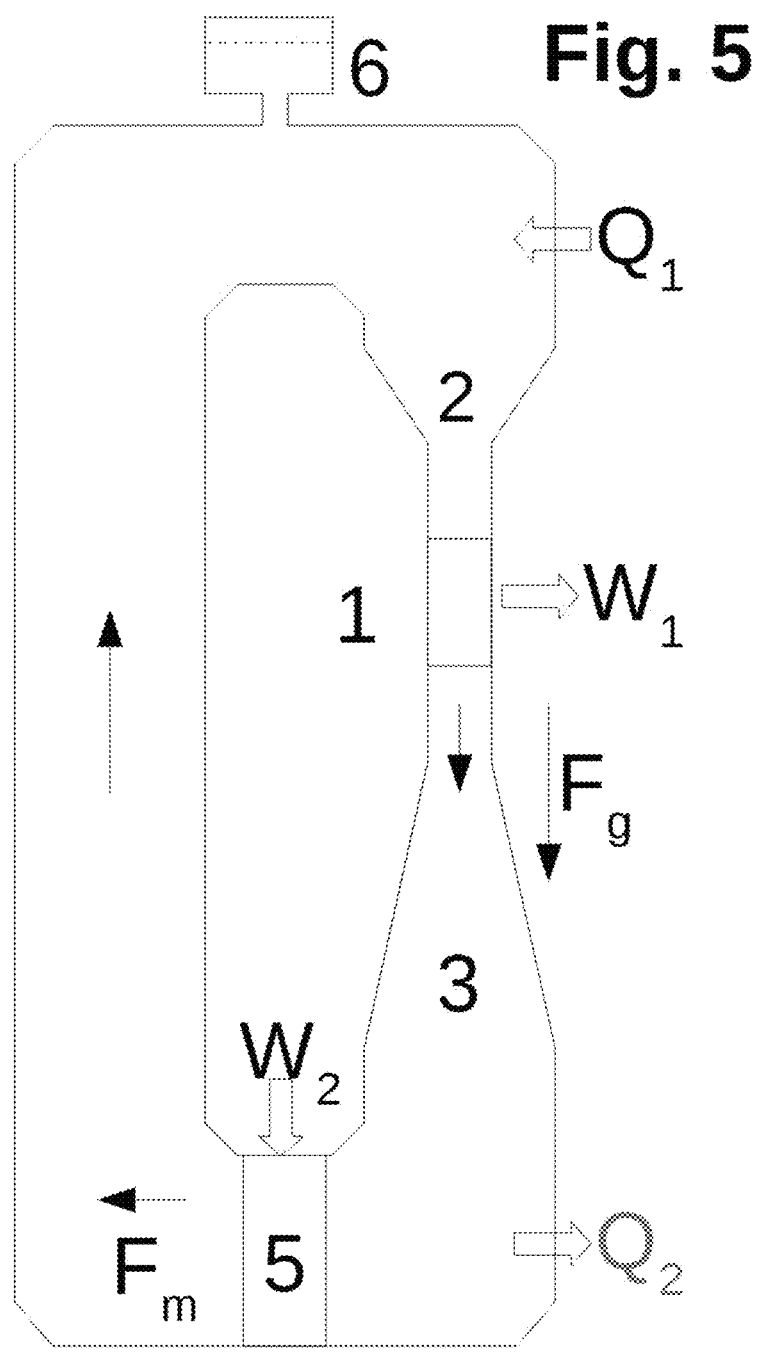
Figure 6:
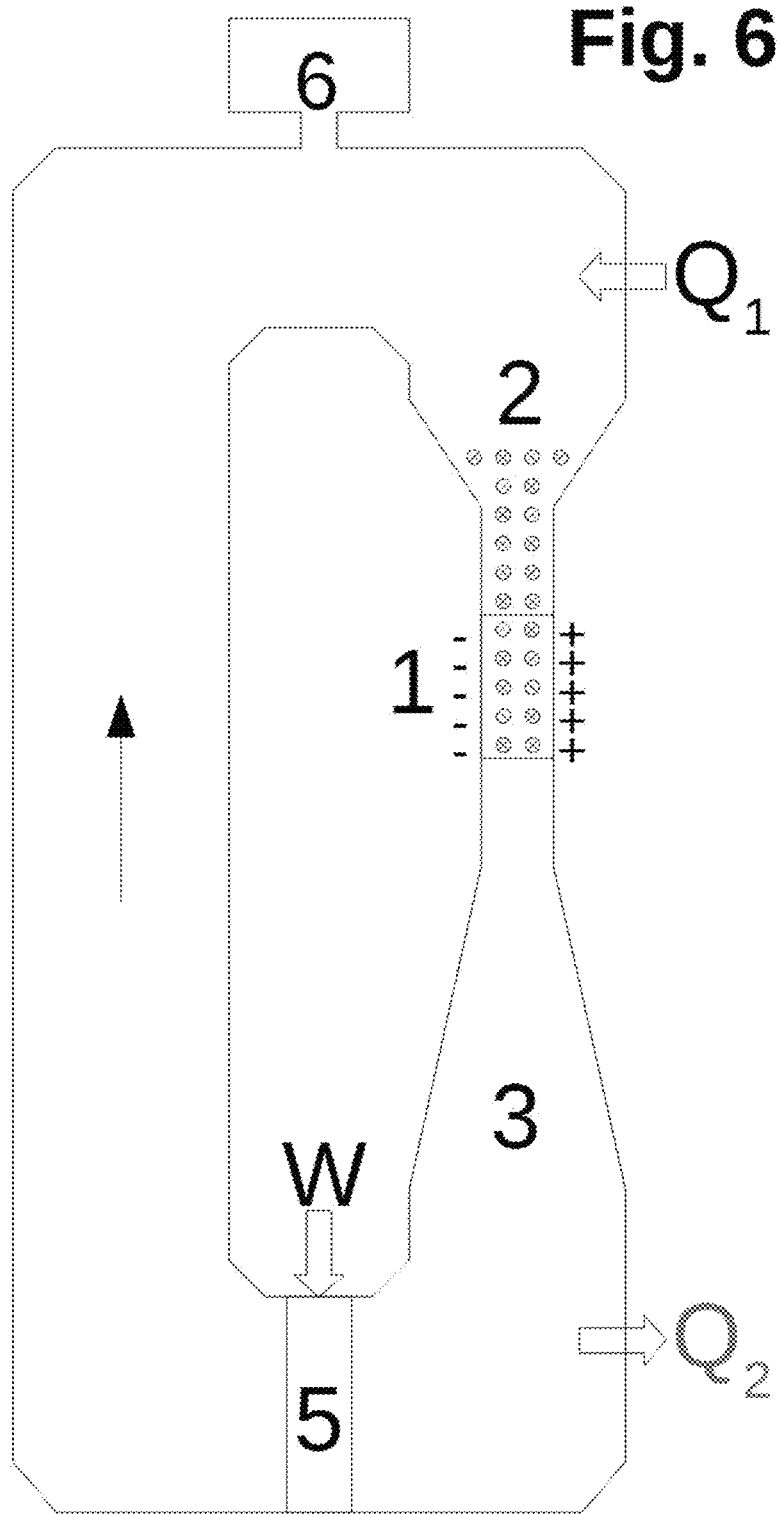
Figure 7:
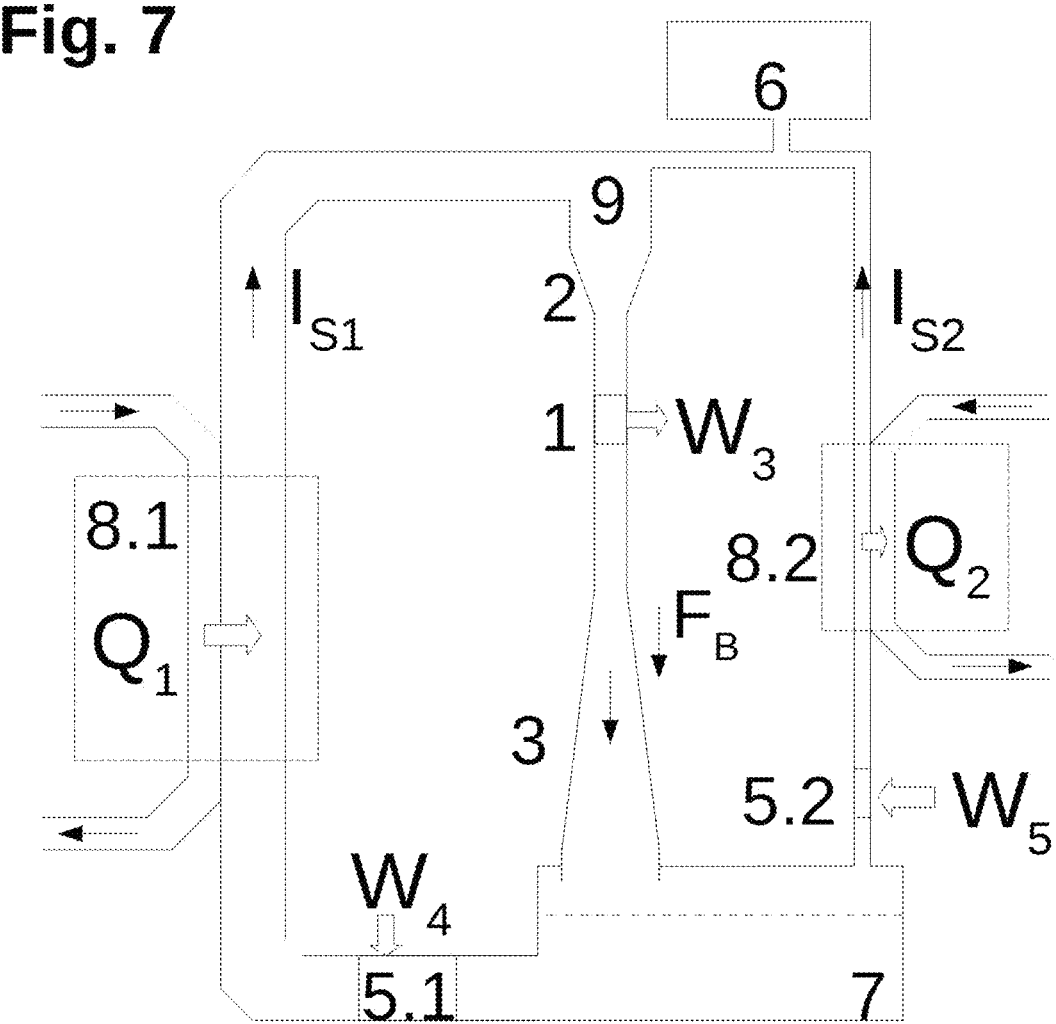
Figure 8:
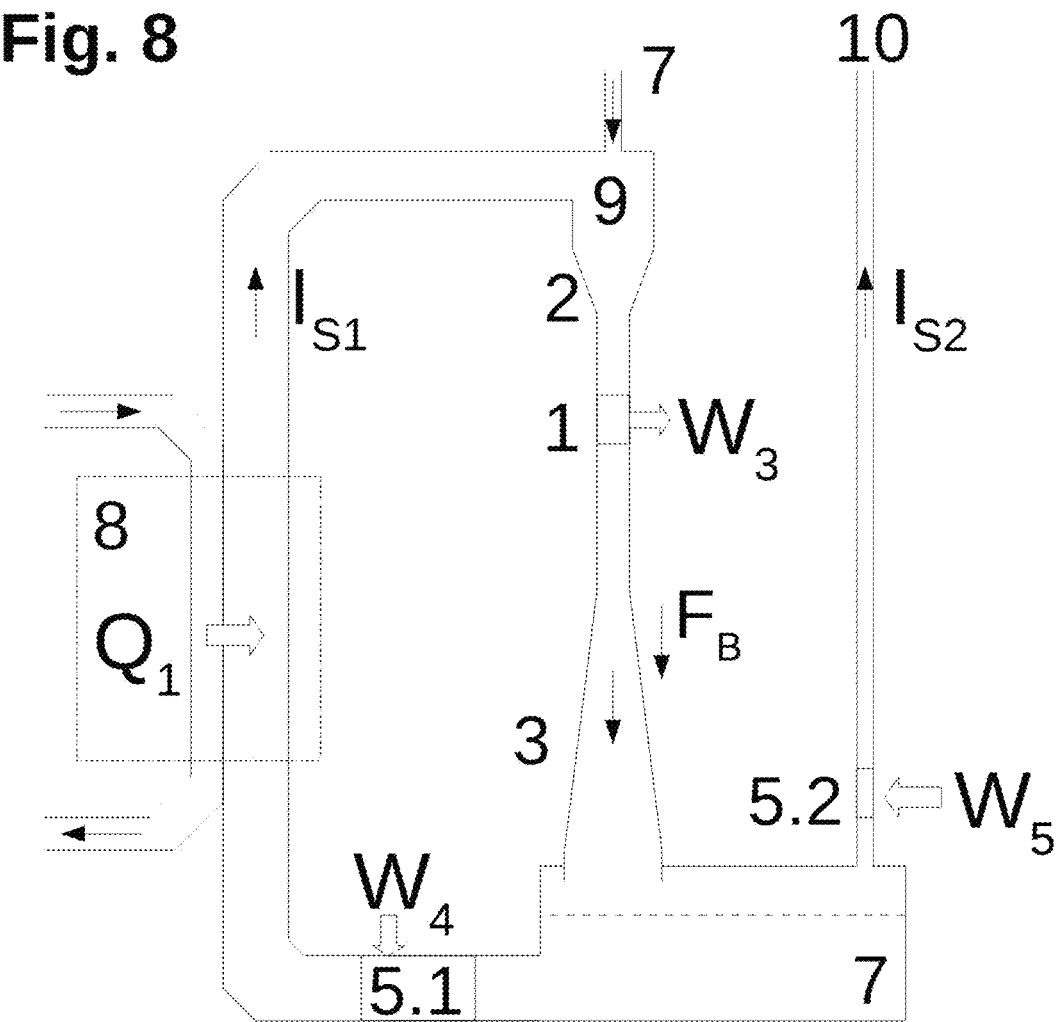
Figure 9:
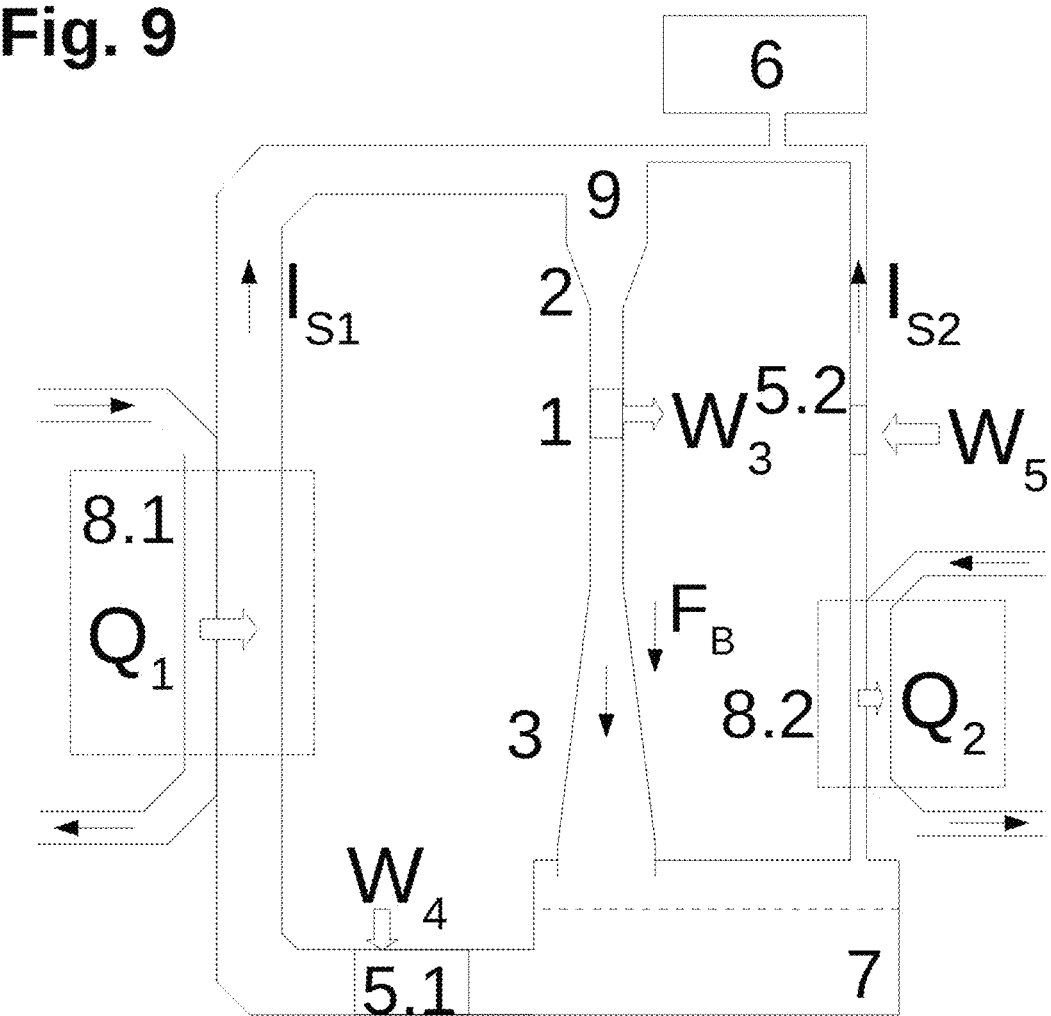
Figure 10:
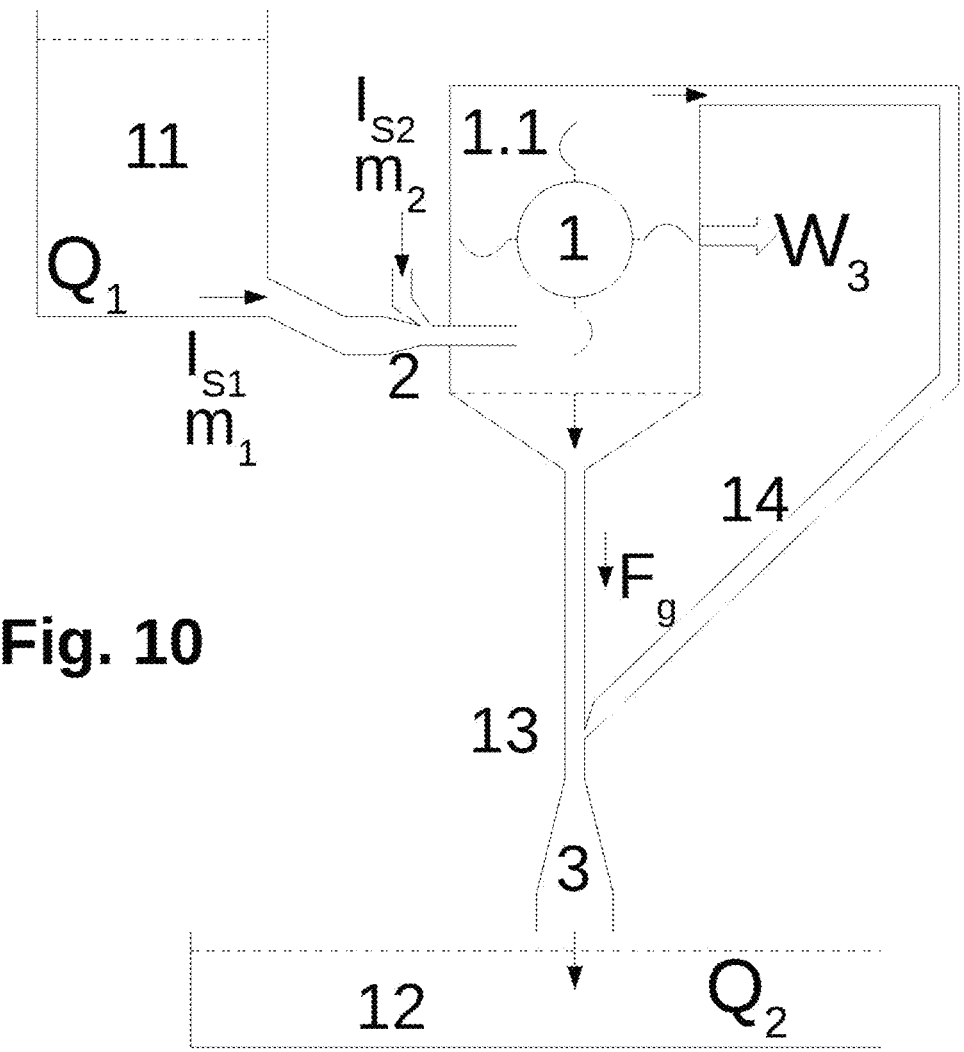

FIG. 3 A further arrangement for using the method according to the invention FIG. 4 A thermodynamic cycle with a centrifugal convergent nozzle and a centrifugal divergent nozzle FIG. 5 A gravitational divergent nozzle FIG. 6 A thermodynamic cycle with an MHD generator FIG. 7 A heat pump with branched entropy circuit FIG. 8 A heat pump with open branched entropy circuit FIG. 9 A heat engine with branched entropy circuit FIG. 10 A hydropower machine FIG. 1 shows a flow of a fluid with a turbomachine 1 according to the prior art. Turbomachine 1 is shown as an impeller. The fluid flow transfers part of its kinetic energy to the turbomachine 1, where it is dissipated as work. The molecules M of the fluid move with the velocity $v_1$ in the flow channel and give off a part of their lateral kinetic energy to the turbomachine at its impellers and then move on with the velocity $v_2$.

FIG. 2 shows an arrangement for using the method according to the invention to increase an entropy flow in a turbomachine 1. For this purpose, a compressible fluid is polytropically expanded in turbomachine 1, which has the form of a turbine. After the polytropic expansion, an additional force $F_B$ acts on the molecules M of the fluid in the direction of flow, so that the molecules M are accelerated in the direction of flow by this force. The force $F_B$ acting in the direction of flow is generated by a force field, whereby the fluid's potential energy is converted into kinetic energy of the fluid. This force $F_B$ accelerates the molecules M of a fluid consisting of gas or a gas mixture downstream of the turbomachine to at least 0.3 times the speed of sound in the fluid, so that the pressure of the fluid, reduced in the turbomachine, is increased again to at least 0.1 times the pressure of the fluid upstream of the turbomachine and thus the pressure reduction necessary for increasing the efficiency of the turbomachine is achieved directly downstream of the turbomachine. In the embodiment shown, the force $F_B$ can be the gravitational force, for example. In the case of a fluid consisting of a mixture of gas and liquid, the pressure reduction is achieved directly downstream of the turbomachine when the velocity $v_2$ of the fluid is at least so high that the translational velocity of the molecules M of the gas (compressible fluid component) is at least 0.3 times the speed of sound in the gas.

FIG. 3 shows a further arrangement for using the method according to the invention. The polytropic expansion in the turbomachine 1 is preceded by a convergent nozzle 2, so that the compressible fluid is accelerated before the turbomachine 1. A divergent nozzle 3 is located downstream of the turbomachine 1 in the direction of flow. Depending on the desired increase in efficiency for the turbomachine, the acceleration at the convergent nozzle upstream of the turbomachine can, for example, be up to 0.31 times or 0.51 times or 0.61 times or 0.81 times or 1.01 times the speed of sound in the fluid. Downstream of the turbomachine, the fluid is then accelerated again as close as possible to the value of the flow velocity upstream of the turbomachine (0.3 times or 0.5 times or 0.6 times or 0.8 times or equal to the speed of sound in the fluid). A compressor 5 is connected downstream of the divergent nozzle 3, although this is optional here. In another embodiment not shown, the compressor 5 is provided instead of the divergent nozzle 3. The fluid can be a pure substance (a gas), a mixture of gases or a mixture of gas and liquid and the force $F_B$ can be the force due to gravity, for example.

FIG. 4a and FIG. 4b show two arrangements for using the method according to the invention in a thermodynamic cycle with a centrifugal convergent nozzle and a centrifugal divergent nozzle. A flow channel with a fluid is set in rotation around a rotational axis 4. This causes a centrifugal force $F_Z$ to act on the fluid and causes the density of the fluid to increase with distance from the rotational axis 4. A compressor 5 is placed at the location with the highest rotational speed. The turbomachine 1 is arranged on the rotational axis 4. The fluid is first accelerated in the convergent nozzle 2 and gives off energy and momentum to the turbomachine 1. Downstream of the turbomachine 1, the fluid is accelerated by the increasing centrifugal force, and the pressure in the divergent nozzle 3 is increased again. Here, too, the molecules M of the fluid are accelerated to at least 0.3 times the speed of sound in the fluid. An amount of thermal energy $Q_1$ can be fed in between the compressor 5 and the convergent nozzle 2. Optionally, an amount of thermal energy $Q_2$ can be dissipated between the divergent nozzle 3 and the compressor 2. In the embodiment according to FIG. 4a, the turbomachine 1 is arranged radially to the rotational axis. In FIG. 4b, the turbomachine 1 is arranged axially to the rotational axis in an alternative embodiment. Again, the fluid can be a pure substance (a gas), a mixture of gases or a mixture of gas and liquid. In the case of a fluid consisting of gas or mixture of gases, the fluid is also accelerated here downstream of the turbomachine to at least 0.3 times the speed of sound in the fluid, so that the pressure of the fluid, reduced in the turbomachine, is increased again to at least 0.1 times the pressure of the fluid upstream of the turbomachine and thus the pressure reduction necessary for increasing the efficiency of the turbomachine is achieved directly downstream of the turbomachine. In the case of a fluid consisting of a mixture of gas and liquid, the pressure reduction is achieved directly downstream of the turbomachine when the velocity $v_2$ of the fluid is at least so high that the translational velocity of the molecules M of the gas (compressible fluid component) is at least 0.3 times the speed of sound in the gas.

In the embodiment shown, the force $F_B$ is therefore provided by the centrifugal force $F_Z$. The thermodynamic machine described with a centrifugal convergent nozzle and centrifugal divergent nozzle is thus also suitable for use in places with low gravity (such as in space).

In one embodiment, the arrangements according to FIG. 3 or FIG. 4a/4b use a multiphase flow in which a phase change (evaporation/condensation) of a component or a reversible chemical reaction is used. If, for example, a mixture of water and isobutane is fed into the convergent nozzle 2 at 4 bar and 300 K, both components are liquid. Due to the acceleration in the convergent nozzle 2, the pressure drops and the isobutane reaches its boiling point. By adding rotational and vibrational energy (of the molecules M) from the liquid water, it can evaporate. The increase in volume further accelerates the flow. Part of the kinetic energy is released in the turbomachine 1. The flow is then laterally accelerated by the gravitational or centrifugal force. Due to the increased pressure in the divergent nozzle 3 and/or in the following compressor 5, the gas condenses with a major reduction in volume. However, the energy released in the process does not have to be dissipated externally, but is stored in the circuit in the form of volume-independent vibrational and rotational energy.

When using a water-carbon-dioxide mixture, the carbon dioxide dissolves in the water and reacts to form carbonic acid. When the pressure drops in convergent nozzle 2, the equilibrium of the solution decreases and gaseous carbon dioxide is released in the flow channel, accelerating the flow. Since a concentration equilibrium is established in the solution, an even release of gas is to be expected here. After the releasing energy in the turbomachine and accelerating in the flow channel, the gas goes back into solution due to the pressure increase in the divergent nozzle 3 and/or in the following compressor 5 and reduces the volume of the multiphase flow. Carbon dioxide then reacts with the water to form carbonic acid.

The choice of components has a significant influence on the working pressure. For substances with low vapour pressures (e.g., an isopropanol/water mixture), the pressure upstream of the convergent nozzle 2 may be less than 1 bar. This simplifies the design. Due to the high density of liquid water, the energy density and entropy flow are nevertheless very high. This makes it possible to achieve a very high speed and energy output in the turbomachine with compact dimensions.

FIG. 5 shows a gravitational divergent nozzle as a further arrangement for using the method according to the invention. A fluid is accelerated in the convergent nozzle 2 and fed to the turbomachine 1. The flow channel and divergent nozzle 3 are arranged in the direction of gravity, whereby the gravitational force $F_G$ acts as a force $F_B$ and accelerates the molecules M of the fluid by converting potential energy into kinetic energy. The machine is dimensioned such that the volume between the compressor 5 and the convergent nozzle 2 is greater than the volume between the turbomachine 1 and the compressor 5. Alternatively, a pressure-balancing vessel 6 can be fitted. In this way, the compressor 5 creates a negative pressure in the turbomachine 1, which increases the efficiency. An amount of thermal energy $Q_1$ is fed in between the compressor 5 and the convergent nozzle 2. Optionally, an amount of thermal energy $Q_2$ can be dissipated between the divergent nozzle 3 and the compressor 5.

Since only the relative speed of the flow is relevant for the energy supply in turbomachines 1, energy can be extracted in a narrow flow channel at high speed with a turbomachine 1 and fed in within a wider flow channel at low speed. According to $E=m/2*v^2$, more energy is released at high speed than is fed in at low speed. The mechanical force ($F_m$) supplied by the compressor 5 acts like the gravitational force $F_g$ and reduces the pressure downstream of the turbomachine 1. For this purpose, the pressure-balancing vessel 6, which keeps the pressure at the inlet of the convergent nozzle 2 constant, is installed between the compressor 5 and the convergent nozzle 2. For compressible fluids, pressure balancing can also be achieved by having a large volume upstream of the convergent nozzle 2 compared to the volume between divergent nozzle 3 and the compressor 5. In open processes, the surrounding atmosphere can be used for pressure balancing. If mechanical work is supplied to the compressor 5, the pressure at the outlet of the divergent nozzle 3 drops. This allows the pressure at the outlet of the turbomachine 1 to drop to almost zero, which permits high flow velocities and thus high efficiency. For this, sufficient energy must be available for the acceleration in the convergent nozzle 2, and this can be provided by a high proportion of vibrational and rotational energy (in the case of complex molecules M or multiphase flows). This accelerates the fluid to supersonic speeds even without a de Laval nozzle. Since the thermal energy $Q_1$ does not need to be fed in at a high temperature, but is only transferred when the relative translational velocity of the molecules M within the flow is reduced, the volume-effective heat capacity and thus the entropy flow $I_S$ at the working machine 1 increases. According to $P=T*I_S$ (P=power, T=temperature, $I_S$=entropy flow), the power P increases at constant input temperature.

The compressor 5 should be located near the lowest point in the cycle. The energy $W_2$ required to operate the compressor 5 can be supplied partly or completely by the mechanical energy $W_1$ released in the turbomachine 1.

The fluid used in the arrangement according to FIG. 5 can be a pure substance (a gas), a gas mixture or a mixture of gas and liquid. In the case of a fluid consisting of gas or mixture of gases, the fluid is also accelerated here downstream of the turbomachine to at least 0.3 times the speed of sound in the fluid, so that the pressure of the fluid, reduced in the turbomachine, is increased again to at least 0.1 times the pressure of the fluid upstream of the turbomachine and thus the pressure reduction necessary for increasing the efficiency of the turbomachine is achieved directly downstream of the turbomachine. In the case of a fluid consisting of a mixture of gas and liquid, the pressure reduction is achieved directly downstream of the turbomachine when the velocity $v_2$ of the fluid is at least so high that the translational velocity of the molecules M of the gas (compressible fluid component) is at least 0.3 times the speed of sound in the gas.

FIG. 6 shows a thermodynamic cycle with a turbomachine designed as an MHD generator as a further arrangement for using the method according to the invention. A mixture of an electrolyte (e.g., an ionised solution) and a compressible fluid is used as the working medium. The mixture is accelerated in the convergent nozzle 2 and flows through a magnetic field of the turbomachine 1, which is designed as an MHD generator. In the process, the charge carriers of the electrolyte are deflected to the left or right and the electrical energy is dissipated via the electrodes. In the divergent nozzle 3, the flow velocity is reduced, converting translational energy into vibrational and rotational energy.

The fluid is compressed in the compressor 5 and flows back to the convergent nozzle 2. The volume between the compressor 5 and the convergent nozzle 2 must be larger than the volume between the MHD generator and the compressor 5. Alternatively, a pressure-balancing vessel 6 can be fitted. In this way, the compressor 5 creates a negative pressure downstream of the MHD generator, which accelerates the flow and increases the efficiency. The thermal energy $Q_1$ is fed in upstream of the convergent nozzle 2. Optionally, thermal energy $Q_2$ can be dissipated downstream of the divergent nozzle 3.

One advantage of this arrangement is a higher achievable magnetic field strength in the narrow flow channel compared to the wider flow channel of a de Laval nozzle. Furthermore, the charge-carrier density in the electrolyte is high, which permits compact dimensions of the machine. In contrast to when an ionised gas is used, the process can also take place at ambient temperature, which reduces the demands on materials and the costs.

FIG. 7 shows a heat pump with a branched entropy circuit for the application of the method according to the invention. A fluid consisting of a first fluid component and a second fluid component, wherein at least the second fluid component is compressible, is accelerated in a convergent nozzle 2 and fed to a turbomachine 1. Downstream of the turbomachine 1, the fluid can optionally be accelerated by the force $F_B$ in the flow channel and divergent nozzle 3, which reduces the pressure at the outlet of the turbomachine 1. Afterwards, the second fluid component, which has a larger $c_p/c_V$ ratio compared to the first fluid component, is separated in the separator 7 and fed to the compressor 5.2, where the second fluid component is accelerated and/or compressed. The temperature increases due to the compression. The first fluid component is fed to the compressor 5.1, wherein the temperature does not change or changes only very slightly compared to the second fluid component. This allows thermal energy $Q_1$ to be fed into the first fluid component by means of the heat exchanger 8.1. The second fluid component, compressed in compressor 5.2, releases its thermal energy $Q_2$ by means of the heat exchanger 8.2. Afterwards, both fluid components are combined in the mixer 9. The volume between the turbomachine 1 and the compressor 5.2 must be smaller than the volume between the compressor 5.1 and the mixer 9. Alternatively, a pressure-balancing vessel 6 can be fitted. In this way the compressors 5.1 and 5.2 generate a negative pressure in the separator 9, which increases the efficiency of the turbomachine 1. For a significant difference, within the working temperature range at compressors 5.1, 5.2, the ratio $c_p/c_V$ of the second fluid component should be at least 1.1 times the ratio $c_p/c_V$ of the first fluid component.

The dimensioning of the entropy flows has a great influence on the efficiency. With the same thermal power at the inlet and outlet ($P_1=P_2$), it follows from $I_{S1}>I_{S2}$ that, according to $P_1=T_1 \cdot I_{S1}=T_2 \cdot I_{S2}=P_2$, also $T_2>T_1$. This means that the mechanical energy supplied—$W_{mech}=|W_4|+|W_5|-|W_3|$—only has to compensate for the process losses. With $T_2=T_1=T$ and $I_{S1}>I_{S2}$, it follows that $P_1>P_2$. A stream of energy then flows out of the machine: $P=T_2 \cdot I_{S2}-T_1 \cdot I_{S1}=T \cdot (I_{S2}-I_{S1})$. This means that, depending on the dimensioning of the entropy flows, the machine can also work as a heat engine.

The mass flows of the fluid components should be dimensioned such that an entropy flow $I_{S1}$ of the first fluid component at the compressor 5.1 is greater than an entropy flow $I_{S2}$ of the second fluid component at the compressor 5.2. For a significant increase in efficiency, the mass flow for $I_{S1}$ at the compressor 5.1 should be at least five times greater than the mass flow for $I_{S2}$ at the second compressor 5.2. The entropy flow at the inlet of the turbomachine is equal to the sum of the two entropy flows $I_{S1}$ and $I_{S2}$.

FIG. 8 shows a heat pump with an open branched entropy circuit. The machine uses a fluid in which the compressible component is air. The air is drawn in from the atmosphere at the inlet 7 and mixed with an incompressible fluid (e.g. water) in the mixer 9. The fluid is accelerated in a convergent nozzle 2 and fed to a turbomachine 1. Downstream of the divergent nozzle 3, the air is separated in the separator 7 and fed to the compressor 5.2. The compressor 5.2 increases the pressure of the air to atmospheric pressure and thus ensures there is a negative pressure in the mixer 9. The heated air then flows back into the atmosphere via the outlet 10. The pressure of the cooler, incompressible component of the fluid is increased to atmospheric pressure in the compressor 5.1. At the heat exchanger 8, the thermal energy $Q_1$ extracted from the air is returned to the incompressible fluid.

FIG. 9 shows a heat engine with a branched entropy circuit (see FIG. 9). The heat engine works in the same way as the heat pump in FIG. 7. In the entropy circuit $I_{S2}$, the thermal energy $Q_2$ is first dissipated in the heat exchanger 8.2 and then the fluid is compressed in the compressor 5.2. Due to a low heat capacity of the fluid component in the entropy circuit $I_{S2}$ in relation to $I_{S1}$, only little thermal energy has to be dissipated.

FIG. 10 shows a hydropower machine for further application of the method, which converts potential and thermal energy into mechanical energy. The water flows from the upper reservoir 11 to the lower reservoir 12. The turbomachine 1, designed as a turbine, is arranged below the upper reservoir. The entropy flow of the water $I_{S1}$ is mixed with air $I_{S2}$ and accelerated in a convergent nozzle 2 with a mixer (e.g., a Venturi or jet-stream nozzle). The air being cooled by the acceleration extracts vibrational and rotational energy from the water molecules and expands almost isothermally. At the same time, the water molecules are accelerated with the air and release their kinetic energy to the turbine 1. The water is separated from the air in the turbine housing 1.1. The water collects at the bottom of the turbine housing 1.1 and is accelerated with a gravitational divergent nozzle. With a fall of 10 m or more, this increases the pressure by about 1 bar, thereby creating a vacuum on the turbine housing 1.1. To maintain this negative pressure, the air must be pumped out through the air duct 14, e.g., by means of a piston pump or a jet-stream pump 13.

LIST OF REFERENCES

M Molecule
1 Turbomachine
1.1 Housing
2 Convergent nozzle
3 Divergent nozzle
4 Rotational axis
Compressor
5.1 Compressor
5.2 Compressor
6 Balancing vessel
7 Separator
8 Heat exchanger
8.1 Heat exchanger
8.2 Heat exchanger
9 Mixer
10 Outlet
11 Reservoir
12 Reservoir
13 Jet-stream pump
14 Air duct

The invention claimed is:

1. A method for operating a turbomachine designed as a heat pump, the method comprising:
   guiding a fluid through the turbomachine to transmit kinetic energy to the turbomachine,
   wherein the fluid has a first fluid component and a second fluid component, where at least one of the first fluid component or second fluid component is compressible, and in a working temperature range of the heat pump, the ratio cp/cV of the second fluid component is at least 1.1 times the ratio cp/cV of the first fluid component;
   separating the first and second fluid component in a separator downstream of the turbomachine;
   accelerating and/or compressing the first fluid component downstream of the separator in a first compressor and accelerating the second fluid component in a second compressor downstream of the separator before releasing thermal energy;
   combining the first and second fluid component in a mixer downstream of the first and second compressors; and
   wherein the mass flows of the first and second fluid components are dimensioned in such a way that an entropy flow IS1 of the first fluid component at the first compressor is greater than an entropy flow IS2 of the second fluid component at the second compressor and an entropy flow downstream of the mixer at the inlet of the turbomachine is the sum of IS1 and IS2.

2. The method of claim 1, wherein the compressible fluid is accelerated in a nozzle in the direction of flow upstream of the turbomachine.

3. The method of claim 1, wherein a divergent nozzle is arranged downstream of the turbomachine in the direction of flow.

4. The method of claim 1, wherein the fluid is a multiphase flow and at least one of the first or second fluid component is gaseous and the other fluid component of the fluid is liquid.

5. The method of claim 1, wherein a fluid mixture consisting of a first fluid and a second fluid is used as the compressible fluid and that the first fluid has a lower vapour pressure than the second fluid, and that the first fluid is liquid both during acceleration at a convergent nozzle and downstream of the turbomachine, and that the second fluid is at least partially gaseous during acceleration at the convergent nozzle and liquid downstream of a divergent nozzle.

6. The method of claim 1, wherein a fluid mixture consisting of a first fluid and a second fluid is used as the compressible fluid, wherein the first fluid is a gas and the second fluid is a liquid, and in that the first fluid is dissolved in the second fluid before acceleration at a convergent nozzle, is released from the second fluid during acceleration at the convergent nozzle and is dissolved again in the second fluid downstream of a divergent nozzle.

7. The method of claim 1, wherein a flow velocity of the fluid is increased by a force FB acting in the direction of flow, and the force FB is a gravitational force, a centrifugal force, a magnetic force, an electrical force or a mechanical force provided by a further turbomachine.

8. The method of claim 1, wherein the turbomachine is a turbine or an MHD generator.

\* \* \* \* \*